United States Patent [19]

Gristina

[11] Patent Number: 4,576,060
[45] Date of Patent: Mar. 18, 1986

[54] BALANCES RUNNING ON GEARS FOR A MOTOR VEHICLE ENGINE

[76] Inventor: Nicholas Gristina, 4401 Knight Dr., New Orleans, La. 70127

[21] Appl. No.: 656,764

[22] Filed: Oct. 1, 1984

[51] Int. Cl.⁴ .......................... F16F 15/26; F02B 75/06
[52] U.S. Cl. .................................. 74/573 R; 74/603; 74/604; 123/192 R; 123/192 B
[58] Field of Search ...................... 74/573 R, 603, 604; 123/192 R, 192 B

[56] References Cited

U.S. PATENT DOCUMENTS

| | | | |
|---|---|---|---|
| Re. 28,512 | 8/1975 | Kinoshita | 74/604 |
| 1,950,350 | 3/1934 | Boland | 74/604 X |
| 2,183,467 | 12/1939 | Sarazin | 74/604 |
| 3,415,237 | 12/1968 | Harkness | 123/192 |
| 3,563,222 | 2/1971 | Ishida | 123/192 |
| 3,626,786 | 12/1971 | Kinoshita et al. | 74/604 |
| 3,791,227 | 2/1974 | Cherry | 74/604 X |
| 4,004,469 | 1/1977 | Kosugi | 74/604 |
| 4,237,741 | 12/1980 | Huf et al. | 74/604 X |
| 4,320,671 | 3/1982 | Curasi | 74/604 |
| 4,440,123 | 4/1984 | Sai | 123/192 B |
| 4,489,683 | 10/1984 | Tsai et al. | 123/192 B |

Primary Examiner—Alan Cohan
Assistant Examiner—John A. Rivell
Attorney, Agent, or Firm—Cushman, Darby & Cushman

[57] ABSTRACT

A mechanical mechanism, for use in an internal combustion engine for changing rectilinear movement of a piston to rotational movement of a crankshaft, is of simple construction and has a minimum number of parts. A small gear with teeth formed on its external peripheral portion is stationarily mounted to a wall of an engine, and receives a first portion of a crankshaft, the crankshaft being rotatable with respect to the gear and the wall about an axis. A second portion of the crankshaft opposite the first is also mounted for rotation with respect to a stationary member. A third portion of the crankshaft is offset from the axis. A balancing structure comprising first and second balance bodies interconnected by a collar, and is mounted so that the crankshaft third portion is received within the collar and rotatable with resepct to the collar. The first balance body has an interior peripheral portion with gear teeth extending radially inwardly, those gear teeth intermeshing with the small gear continuously as the collar revolves around the crankshaft axis. Bearings interconnect the collar to one or more pistons.

20 Claims, 5 Drawing Figures 4,576,060

BALANCES RUNNING ON GEARS FOR A MOTOR VEHICLE ENGINE

BACKGROUND AND SUMMARY OF THE INVENTION

The invention relates to a balancing mechanism for facilitating proper balance in a mechanical mechanism wherein rectilinear movement (in the form of piston reciprocation) is transformed to rotary movement (in the form of rotation of a crankshaft). A number of mechanisms have been utilized in the prior art for providing such balancing, as shown in U.S. Pat. Nos. 4,004,469, 4,320,671, and 1,950,350. The invention seeks to achieve good balancing action in a manner that is simplified compared to the prior art structures.

According to the present invention, a balancing mechanism is provided which has a pair of balancing bodies connected to opposite ends of a collar which receives the offset portion of the crankshaft. One of the balancing bodies has an internal peripheral portion with gear teeth formed thereon, and those gear teeth mesh with the teeth on a small gear having teeth extending from the external circumferential periphery thereof. The small gear is rigidly connected to an engine wall or the like, and the crankshaft passes through it for rotation with respect to it.

In the use of the apparatus according to the invention, one or more pistons are connected by conventional bearing means to the collar, which is integral with the balance bodies. The balance bodies preferably have substantially the same dimensions and mass. With the utilization of the structure according to the invention, one structure (a balance body) is able to perform a dual function, and thus the number of parts are minimized, and the ease of construction of the apparatus is enhanced. Utilizing the apparatus according to the invention the power output of the crankshaft may be increased, and the fuel economy of the engine may be increased too.

It is the primary object of the present invention to provide a simple yet effective mechanism for converting the rectilinear movement of a piston of an internal combustion engine into rotary movement of an engine crankshaft. This and other objects of the invention will become clear from an inspection of the detailed description of the invention, and from the appended claims.

DETAILED DESCRIPTION OF THE DRAWINGS

A mechanical mechanism according to the present invention, for changing rectilinear motion to rotary motion, is particularly applicable to an internal combustion engine. The apparatus according to the invention provides for balancing of the engine, and improved power and economy.

Figure 1:
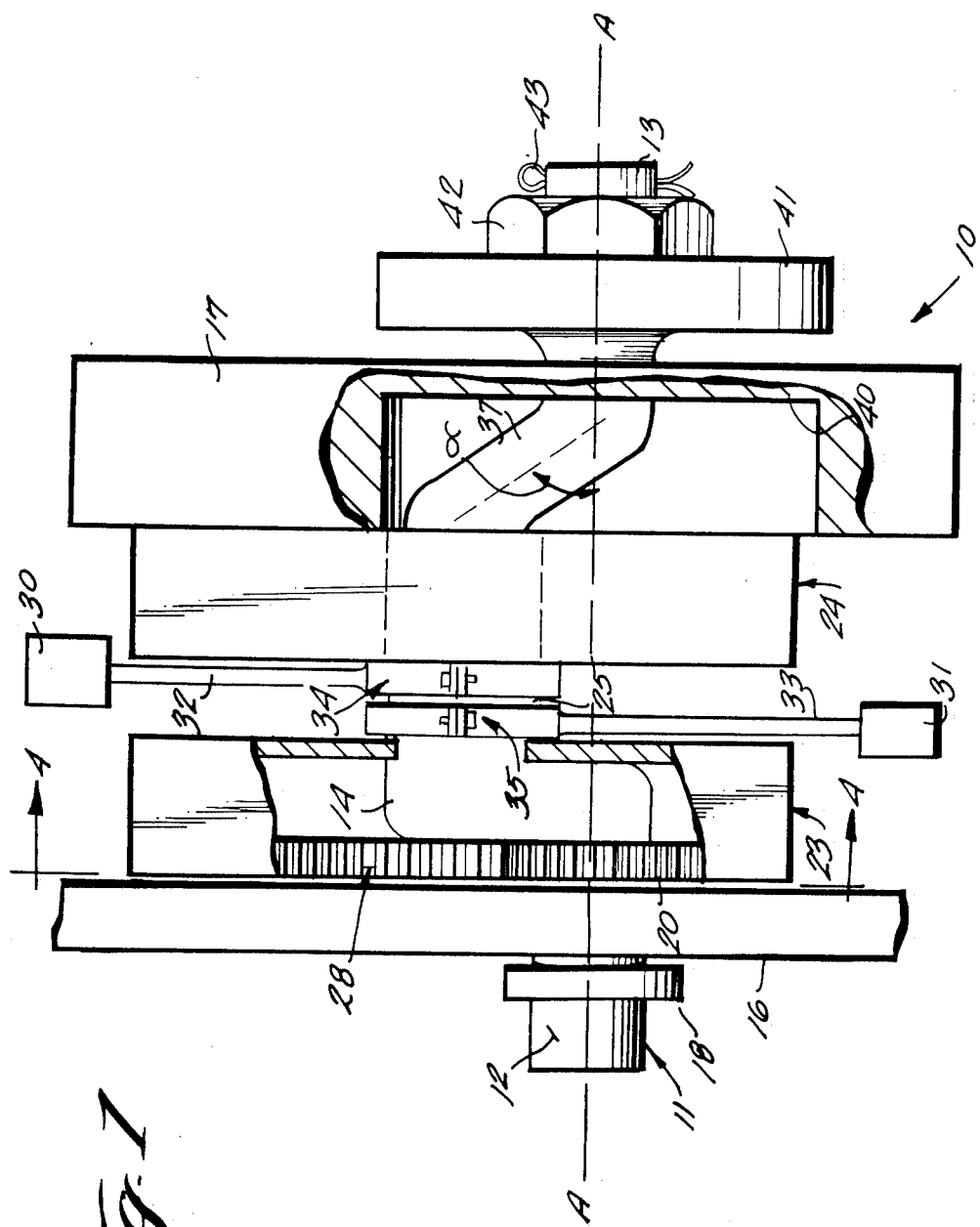
FIG. 1 is a side view, with portions cut away for clarity of illustration, of an exemplary mechanical mechanism according to the present invention.

The components of the present invention are shown generally by reference number 10 in FIG. 1. A crankshaft 11 having a first end portion 12, and a second end portion 13 is mounted for rotation about the axis A—A, which is concentric with the first and second end portions 12, 13. A third portion 14 is provided which is offset from the axis A—A. The crankshaft 11 is mounted for rotation about axis A—A by a front motor wall 16, and another stationary engine wall 17, and suitable bearing means (not shown) are provided for mounting the crankshaft. At the end 12 on the opposite side of wall 16 from the offset portion 14, a timing gear 18 is preferably connected to the crankshaft 11.

Figure 3:
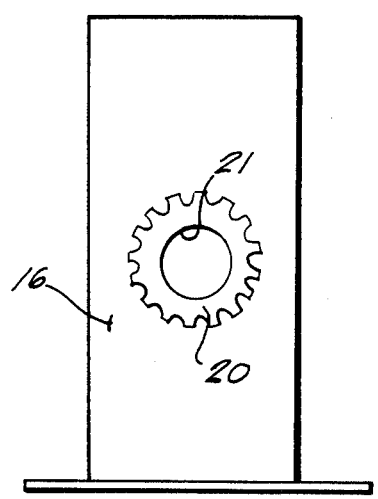
FIG. 3 is a detail end view of the small gear of the structure of FIG. 1.
Figure 4:
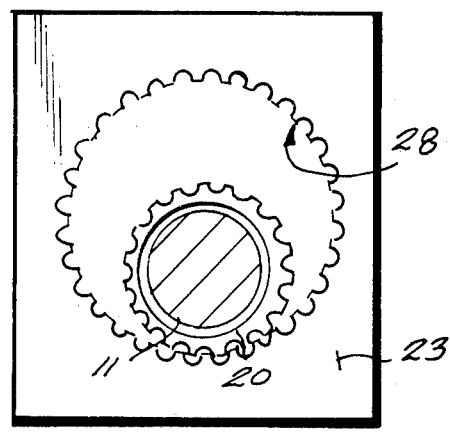
FIG. 4 is a cross-sectional view taken along line 4—4 of FIG. 1, and with components behind the second gear not shown for clarity of illustration.

Surrounding the crankshaft end portion 12, and concentric with axis A—A, is a first gear 20 which has teeth extending radially outwardly from the circumferential periphery thereof, the gear 20 most clearly seen in FIGS. 1, 3, and 4. The crankshaft 11 rotates freely within the central opening 21 (see FIGS. 3 and 4) of the gear 20, the gear remaining stationary on the wall 16, being rigidly attached (as by welding thereto).

Figure 2:
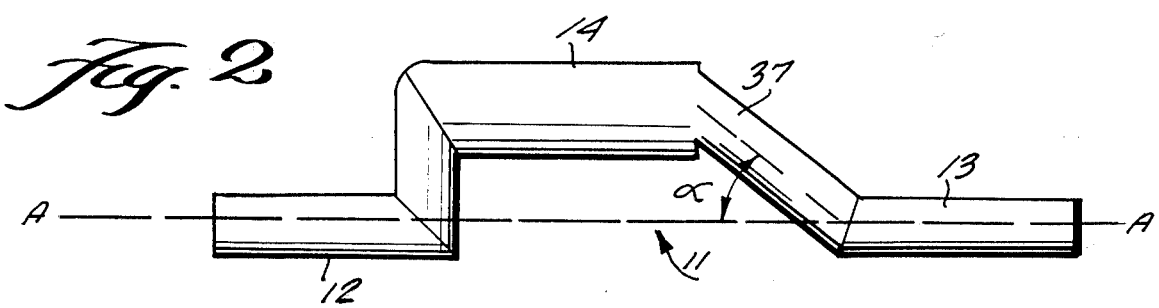
FIG. 2 is a side detail view of the crankshaft of the structure of FIG. 1.
Figure 5:
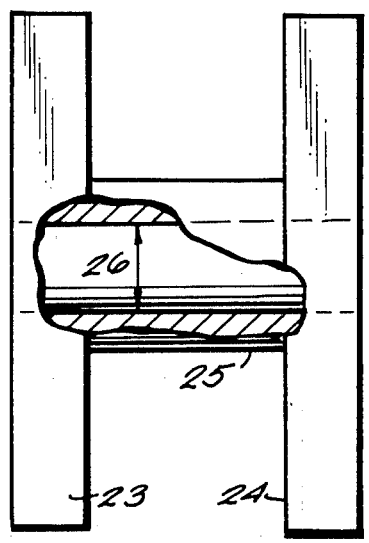
FIG. 5 is a side view of the balancing component per se of the structure of FIG. 1.

The mechanical mechanism 10 also comprises balancing means comprising a first balance body 23 and a second balance body 24 interconnected by a collar 25 (see FIGS. 1 and 5). The collar 25 is dimensioned so that it has an internal diameter 26 (see FIG. 5) which is slightly greater than the diameter of the crankshaft third portion 14 (see FIG. 2), so that the crankshaft 11 may rotate within the opening 26. The balance bodies 23, 24 have substantially the same mass and dimensions.

A second gear 28 (see FIGS. 1 and 4) is formed in the balance body 23, and has teeth extending radially inwardly from an interior peripheral surface of the balance body 23. The teeth of the gear 28 mesh with the teeth of the gear 20 so that they interengage during the entire revolution of the crankshaft third portion 14 about the axis A—A.

Operatively connected to the exterior surface of the collar 25 are one or more rectilinearly movable elements, such as pistons 30, 31, each having an associated rod 32, 33, respectively. The rods 32, 33 are connected to the collar 25 by conventional bearings 34, 35, respectively.

In order to facilitate assembly of the components of the apparatus 10, a fourth portion (see FIGS. 1 and 2) 37 of the crankshaft 11 is provided. The portion 37 makes a distinctly acute angle $\alpha$ with respect to the axis A—A ($\alpha$ preferably equal to approximately 45°), and is dimensioned to facilitate operative movement of the balancing means 23-25 into operative association with the crankshaft. This may be accomplished, in part, by making the diameter of the fourth portion 37 slightly less than that of the third portion 14 (see FIG. 2).

The balancing means 23-25 preferably is constructed of metal, and the components are integral; for instance the balance bodies 23, 24 may be welded to the opposite ends of the collar 25. The balance bodies 23, 24 may have any desired configuration, such as having a polygonal shape in end view (see FIG. 4).

ASSEMBLY

To assemble the apparatus 10 into an operative configuration, one passes the second end portion 13 of the crankshaft 11 through the first balance body 23, through the central opening 26 in collar 25, and through the central opening in the second balance body 24. Then by turning the crankshaft 11 the angle α (approximately 45°), the fourth portion 37 may also be passed through the balance body 23, opening 26, and second balance body 24, and then by turning the crankshaft 11 45° again the third portion 14 of the crankshaft 11 may be passed so that it is received within the interior of the collar 25, and is rotatable within the central opening 26 therein.

In assembly of an engine with which the apparatus 10 is to be utilized, the crankshaft first end portion 12 is then passed through the central opening 21 in first gear 20, and through an aligned opening in the front motor wall 16. The second end portion 13 of the crankshaft 11 is passed through cutout 40 in wall 17, and an opening therein aligned with the opening 21, and then the wall 17 is made stationary within the engine compartment. A flywheel 41 preferably is attached to the end 13, and is held in place by a lock nut 42 with a keyway, retained in place by a cotter pin 43 or the like. Timing gear 18 is placed on the crankshaft end 12.

Once the crankshaft 11 is in position within the engine compartment, the rods 32, 33 are connected up to the collar 25 by suitable fasteners holding the bearing means 34, 35 in place, and the apparatus is then ready for operation.

OPERATION

When the engine of which the pistons 30, 31 form a part is started up, the reciprocations of the pistons 30, 31, is translated into rotational movement of the offset portion 14 of the crankshaft 11, which in turn causes rotation of the crankshaft 11 about the axis A—A. As the collar 25 revolves around the axis A—A, the teeth of the second gear 28 engage the teeth of the stationary first gear 20 during the entire path of revolution, the gears having a ratio of 3-1. The crankshaft 11 can rotate with respect to the balance means 23-25 within the central opening 26 of the collar 25. During rotation of the apparatus 10, appropriate balancing action is provided due to the balance bodies 23, 24 and the mass distribution provided by the bodies 23, 24 during the gear driven revolution thereof. The apparatus 10 according to the present invention is extremely simple and straight-forward, the balance body 23 performing both the function of a gear mechanism and a balancing mass, and the apparatus according to the invention is extremely easy to install and utilize.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A mechanical mechanism comprising:
   a crankshaft having first and second opposite end portions mounted for rotation about an axis, and having a third portion offset from said axis;
   a first gear having teeth formed on the external circumferential periphery thereof, said gear mounted so that it is stationary with respect to said crankshaft;
   a second gear having teeth extending inwardly from an internal peripheral portion thereof;
   balancing means comprising said second gear, another body, and a collar interconnecting said body and said second gear;
   said third portion of said crankshaft received within said collar and rotatable with respect to said collar; and
   said first and second gears intermeshing as said second gear revolves around said crankshaft axis.

2. In an internal combustion engine comprising at least one reciprocal piston, a stationary engine wall, and a crankshaft having first and second opposite end portions mounted for rotation about an axis with respect to said stationary engine walls, and having a third portion offset from said axis, the combination comprising:
   a first gear having teeth extending outwardly from the exterior circumferential periphery thereof, said first gear mounted so that it is stationary with respect to said engine wall;
   a second gear having teeth extending inwardly from an interior peripheral portion thereof, said second gear teeth intermeshing with said first gear teeth; and
   said second gear operatively connected to said crankshaft third portion and operatively connected to said reciprocal piston so that said second gear revolves around said axis and rotates with respect to said crankshaft under the influence of said first and second gears.

3. Apparatus for changing rectilinear motion to rotational motion comprising:
   first and second stationary members;
   a crankshaft including first and second opposite end portions mounted for rotation about an axis in said first and second stationary members, respectively, and having a third portion offset from said axis;
   at least one reciprocal piston reciprocal in a dimension generally perpendicular to said axis;
   a collar surrounding said crankshaft third portion and receiving said crankshaft third portion so that there is relative rotation between said collar and said crankshaft;
   bearing means interconnecting said collar and said piston;
   a first gear stationarily mounted on said first member and concentric with said axis of rotation of said crankshaft;
   first and second balance bodies rigidly connected to said collar and extending radially outwardly therefrom and on opposite sides thereof; and
   said first balance body having second gear means associated therewith cooperating with said first gear means.

4. A mechanism as recited in claim 1 wherein said first gear is concentric with said axis of rotation of said crankshaft, said first portion of said crankshaft passing through a central opening in said first gear.

5. A mechanism as recited in claim 4 further comprising bearing means operatively associated with said collar for operatively attaching said collar to one or more reciprocal elements.

6. A mechanism as recited in claim 5 wherein said second and third portions of said crankshaft are interconnected by a fourth, angled portion making a distinctly acute angle with respect to said axis of rotation, and dimensioned to allow said collar to receive said crankshaft by passing said collar over said crankshaft second portion, over said crankshaft fourth portion, and then into operative association with said crankshaft third portion.

7. A mechanism as recited in claim 5 consisting essentially of said crankshaft, said first gear, said second gear, said collar, said another balancing body, and said bearing means.

8. A mechanism as recited in claim 1 wherein said second and third portions of said crankshaft are interconnected by a fourth, angled portion making a distinctly acute angle with respect to said axis of rotation, and dimensioned to allow said collar to receive said crankshaft by passing said collar over said crankshaft second portion, over said crankshaft fourth portion, and then into operative association with said crankshaft third portion.

9. In a combination as recited in claim 2, wherein said first gear is concentric with said axis of rotation of said crankshaft, said first portion of said crankshaft passing through a central opening in said first gear.

10. In a combination as recited in claim 2, bearing means operatively connecting said second gear to said piston.

11. In a combination as recited in claim 10, a collar surrounding said crankshaft third portion and receiving said crankshaft so that it is rotatable with respect to said collar, and a balance body generally comparable in dimensions to said second gear; said collar integral with said second gear and said balance body, said second gear extending radially outwardly from one end of said collar, and said balance body extending radially outwardly from an opposite end of said collar; and wherein said bearing means is operatively connected to said collar.

12. In a combination as recited in claim 2, a collar surrounding said crankshaft third portion and receiving said crankshaft so that it is rotatable with respect to said collar, and a balance body generally comparable in dimensions to said second gear; said collar integral with said second gear and said balance body, said second gear extending radially outwardly from one end of said collar, and said balance body extending radially outwardly from an opposite end of said collar.

13. In a combination as recited in claim 12 wherein said second and third portions of said crankshaft are interconnected by a fourth, angled portion making a distinctly acute angle with respect to said axis of rotation, and dimensioned to allow said collar to receive said crankshaft by passing said collar over said crankshaft second portion, over said crankshaft fourth portion, and then into operative association with said crankshaft third portion.

14. In a combination as recited in claim 13, wherein said first gear is concentric with said axis of rotation of said crankshaft, said first portion of said crankshaft passing through a central opening in said first gear.

15. Apparatus as recited in claim 3 wherein said second and third portions of said crankshaft are interconnected by a fourth, angled portion making a distinctly acute angle with respect to said axis of rotation, and dimensioned to allow said collar to receive said crankshaft by passing said collar over said crankshaft second portion, over said crankshaft fourth portion, and then into operative association with said crankshaft third portion.

16. Apparatus as recited in claim 3 wherein said first gear comprises a gear having teeth extending radially outwardly from the circumferential external periphery thereof; and wherein said second gear means comprises a second gear including teeth extending radially inwardly from an inner circumferential peripheral portion thereof.

17. Apparatus as recited in claim 16 wherein said first and second balance bodies have approximately the same mass.

18. Apparatus as recited in claim 16 consisting of said stationary members, one or more of said pistons, said collar, said bearing means, said first gear, and said first and second balance bodies including said second gear.

19. Apparatus as recited in claim 3 wherein said first and second balance bodies have a polygonal shape in end view.

20. Apparatus as recited in claim 15 wherein said first gear comprises a gear having teeth extending radially outwardly from the circumferential external periphery thereof; and wherein said second gear means comprises a second gear including teeth extending radially inwardly from an inner circumferential peripheral portion thereof.

* * * * *